United States Patent [19]

Inagaki et al.

[11] Patent Number: 4,942,460
[45] Date of Patent: Jul. 17, 1990

[54] METHOD OF AND APPARATUS FOR RECORDING A HALFTONE DOT COLOR IMAGE ON A COLOR PHOTOSENSITIVE MATERIAL

[75] Inventors: Yukihiko Inagaki; Yoshikazu Masuda; Shigeru Sasada; Mikizo Katsuyama; Hirohisa Tanaka, all of Kyoto, Japan

[73] Assignee: Dainippon Screen Mfg. Co., Ltd., Japan

[21] Appl. No.: 281,541

[22] Filed: Dec. 8, 1988

[30] Foreign Application Priority Data

Dec. 11, 1987 [JP] Japan .................. 62-312279

[51] Int. Cl.$^5$ ............................................ H04N 1/46
[52] U.S. Cl. ...................................... 358/75; 358/80; 355/32; 355/37
[58] Field of Search ............ 358/75, 78, 79, 80, 358/302, 429; 355/32, 37

[56] References Cited

U.S. PATENT DOCUMENTS

| | | | |
|---|---|---|---|
| 4,462,043 | 7/1984 | Saitou | 358/75 |
| 4,499,489 | 2/1985 | Gall et al. | 358/78 |
| 4,681,427 | 7/1987 | Plummer | 358/75 |
| 4,769,696 | 9/1988 | Utsuda et al. | 358/75 |

FOREIGN PATENT DOCUMENTS 07994 12/1987 World Int. Prop. O. .

Primary Examiner—James J. Groody
Assistant Examiner—Jerome Grant, II
Attorney, Agent, or Firm—Ostrolenk, Faber, Gerb & Soffen

[57] ABSTRACT

Color separation image signals (Y, M, C, K) are converted into halftone dot image signals ($Y_d$, $M_d$, $C_d$, $K_d$) by a halftone block circuit (29). Red, green, blue and white beams are obtained from red, green and blue light sources (31R, 31G, 31B) or from a single white light source. These beams are modulated by acousto-optical modulators (32R, 32G, 32B, 35) responsive to the halftone dot image signals ($Y_d$, $M_d$, $C_d$, $K_d$) and thereafter converged onto a color photosensitive material (23), to produce a halftone dot color image on the color photosensitive material (23).

16 Claims, 4 Drawing Sheets

METHOD OF AND APPARATUS FOR RECORDING A HALFTONE DOT COLOR IMAGE ON A COLOR PHOTOSENSITIVE MATERIAL

BACKGROUND OF THE INVENTION

1. Field of the Invention

The present invention relates to a method of and an apparatus for recording the duplicate color image of a color original on a color photosensitive material by exposing the color photosensitive material with a modulated beam. The beam is modulated in response to a color separation image signal which is generated by a computer in response to the photoelectrical scanning of the color original. More particularly, the present invention relates to a method of and an apparatus for recording the duplicate color image as a halftone dot image similar to a multicolor printed matter.

2. Description of the Prior Art

FIG. 1 shows a conventional apparatus for recording a color image on a color photosensitive material by scanning the color photosensitive material while exposing the same by a beam modulated in response to a color separation image signal. This apparatus is utilized for color proof in a multicolor printing, for example.

Referring to FIG. 1, an original drum 2 on which a color original 1 is attached and a recording drum 4 on which a color photosensitive material 3 is attached are coaxially or synchronously rotated by a motor 5, while a pickup head 6 and a exposure head 7 provided opposite to the original drum 2 and the recording drum 4, respectively, are moved along the respective axial directions of the drums 2 and 4.

The pickup head 6 has a well known function of color separation photoelectrical conversion, to output color separation image signals R, G and B of red, green and blue in response to the tone and density of the color original 1 at a scanning point. These color separation image signals R, G and B are received by a color arithmetic circuit 8 of a post-stage, which performs desired color correction and the like to convert the received color separation image signals R, G and B into other color separation image signals Y, M, C and K of yellow, magenta, cyan and black for use in forming color separation blocks The color arithmetic circuit 8 has a structure similar to that in a well known electronic color process scanner.

The color separation image signals Y, M, C and K are received by a color conversion circuit 9 which converts these signals Y, M, C and K into recording control color image signals y, m and c of yellow, magenta and cyan which contains the image recording of the color photosensitive material 3. These signals y, m and c are received by the exposure head 7 which comprises three light sources 10R, 10G and 10B for emitting red, green and blue beams, respectively, acousto-optical modulating elements (hereinafter referred to as AOMs) 11R, 11G and 11B placed on optical paths of the respective beams for modulating the respective beams and a mirror 12 and dichroic or half mirrors 13 and 14 for combining the three modulated beams from the AOMs 11R, 11G and 11B along a common optical path. The AOMs 11R, 11G and 11B modulate the red, green and blue beams in response to the signals c, m and y, respectively. The color photosensitive material 3 is scanned and exposed by the combined beam and thereby the duplicate color image of the original 1 is recorded on the color photosensitive material 3.

In general in an electronic color process scanner, color separation images are recorded on films on the basis of the color separation image signals Y, M, C and K, and thereafter machine plates or blocks corresponding to the color separation images are formed by using the films. These machine blocks are used for practical multicolor printing wherein images of the machine blocks are printed in a overlapped manner by using corresponding color inks. In general, color proof is performed prior to such process and printing steps. The color proof may be performed by using the above system for producing the duplicate color image of the original 1 recorded on the color photosensitive material 3. However, this system is not so suitable for the color proof, since it can produce only a continuous tone image while the image of practical multicolor printing system is a halftone dot image.

SUMMARY OF THE INVENTION

According to a first aspect of the present invention, a method of recording a halftone dot color image on a color photosensitive material comprises the steps of preparing a color photosensitive material, providing red, green and blue beams, forming a white beam by compounding the red, green and blue beams, providing color separation image signals of yellow, magenta, cyan and black of a desired color image, converting the color separation image signals into halftone dot image signals of yellow, magenta, cyan and black having particular screen angles, modulating the red, green, blue and white beams in response to the halftone dot image signals of cyan, magenta, yellow and black, respectively, to generate modulated red, green, blue and white beams, converging the modulated red, green, blue and white beams onto the color photosensitive material to form an exposure beam spot, and scanning the color photosensitive material with the exposure beam spot by relatively moving the color photosensitive material and the exposure beam spot to record the desired color image in a halftone dot manner on the color photosensitive material.

According to a second aspect of the present invention, a method of recording a halftone dot color image on a color photosensitive material comprises the steps of, preparing a color photosensitive material, providing a white beam, separating red, green and blue beams from the white beam, providing color separation image signals of yellow, magenta cyan and black of a desired color image, converting the color separation image signals into halftone dot image signals of yellow, magenta, cyan and black having particular screen angles, modulating the red, green, blue and white beams in response to the halftone dot image signals of cyan, magenta, yellow and black, respectively, to form modulated red, green, blue and white beams, converging the modulated red, green, blue and white beams onto the color photosensitive material to form an exposure beam spot, and scanning the color photosensitive material with the exposure beam spot by relatively moving the color photosensitive material and the exposure beam spot to record the desired color image in a halftone dot manner on the color photosensitive material.

According to a third aspect of the present invention, an apparatus for recording a halftone dot color image on a color photosensitive material comprises means for setting a color photosensitive material, means for providing red, green and blue beams, means for forming a white beam by compounding the red, green and blue beams, means for providing color separation image signals of yellow, magenta, cyan and black of a desired color image, means for converting the color separation image signals into halftone dot image signals of yellow, magenta, cyan and black having particular screen angles, means for modulating the red, green, blue and white beams in response to the halftone dot image signals of cyan, magenta, yellow and black, respectively, to generate modulated red, green, blue and white beams, means for converging the modulated red, green, blue and white beams onto the color photosensitive material to form an exposure beam spot, and means for scanning the color photosensitive material with the exposure beam spot by relatively moving the color photosensitive material and the exposure beam spot to record the desired color image in a halftone dot manner on the color photosensitive material.

According to a fourth aspect of the present invention, an apparatus for recording a halftone dot color image on a color photosensitive material comprises means for setting a color photosensitive material, means for providing a white beam, means for extracting red, green and blue beams from the white beam, means for providing color separation image signals of yellow, magenta, cyan and black of a desired color image, means for converging the color separation image signals into halftone dot image signals of yellow, magenta, cyan and black having particular screen angles, means for modulating the red, green, blue and white beams in response to the halftone dot image signals of cyan, magenta, yellow and black, respectively, to form modulated red, green, blue and white beams, means for converging the modulated red, green, blue and white beams onto the color photosensitive material to form an exposure beam spot, and means for scanning the color photosensitive material with the exposure beam spot by relatively moving the color photosensitive material and the exposure beam spot to record the desired color image in a halftone dot manner on the color photosensitive material.

According to the present invention, a halftone dot color image similar to a multicolor printed matter can be recorded on a color photosensitive material, and hence color proof can easily and precisely be performed. Further, a color image having high similarity to a resulting printed matter can be recorded since color beams for exposure are modulated in response to halftone dot image signals applied to a practical process in a multicolor printing. Still further, a color conversion circuit for converting color separation image signals into recording control image signals is not necessary but a halftone block circuit or dot generator generally provided in a standard electronic color process scanner can be applied, to increase easiness in fabrication and reliability.

Accordingly, it is an object of the present invention to provide a method of and an apparatus for recording a halftone dot color image on a color photosensitive material which can easily generate a halftone dot color image similar to a multicolor printed matter with simple structure.

These and other objects, features, aspects and advantages of the present invention will become more apparent from the following detailed description of the present invention when taken in conjunction with the accompanying drawings.

DETAILED DESCRIPTION OF THE EMBODIMENTS

Figure 1:
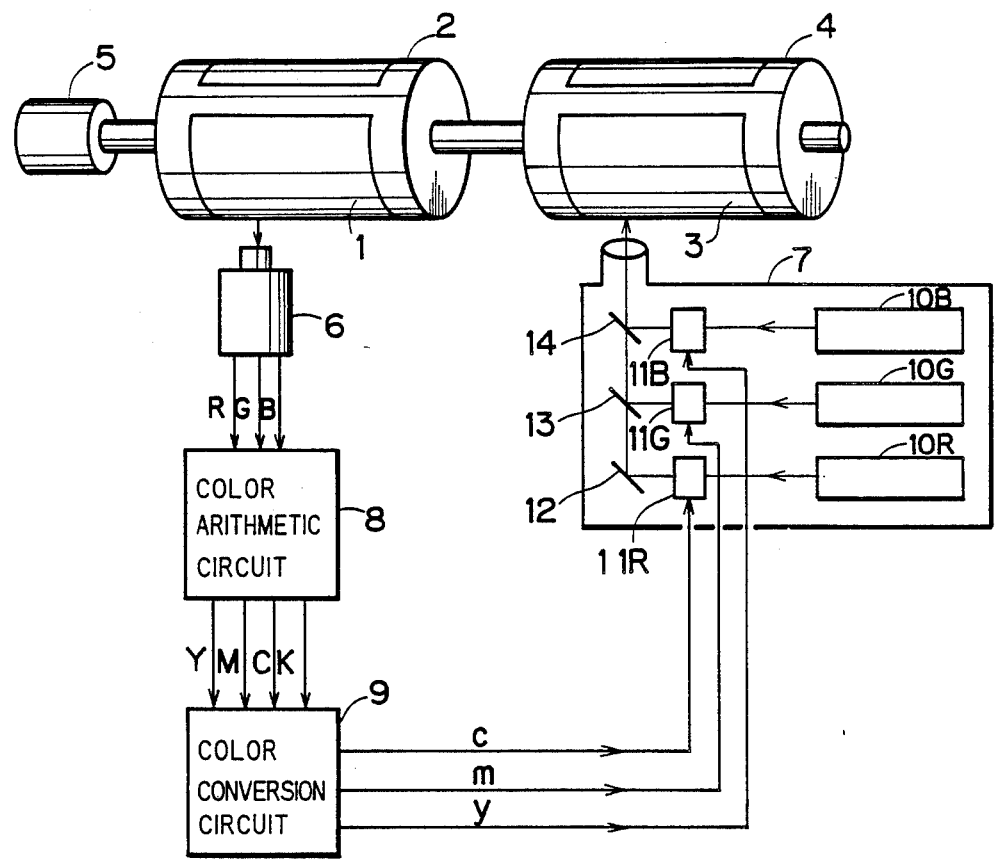
FIG. 1 is a block diagram showing a conventional apparatus for recording a color image on a color photosensitive material.
Figure 2:
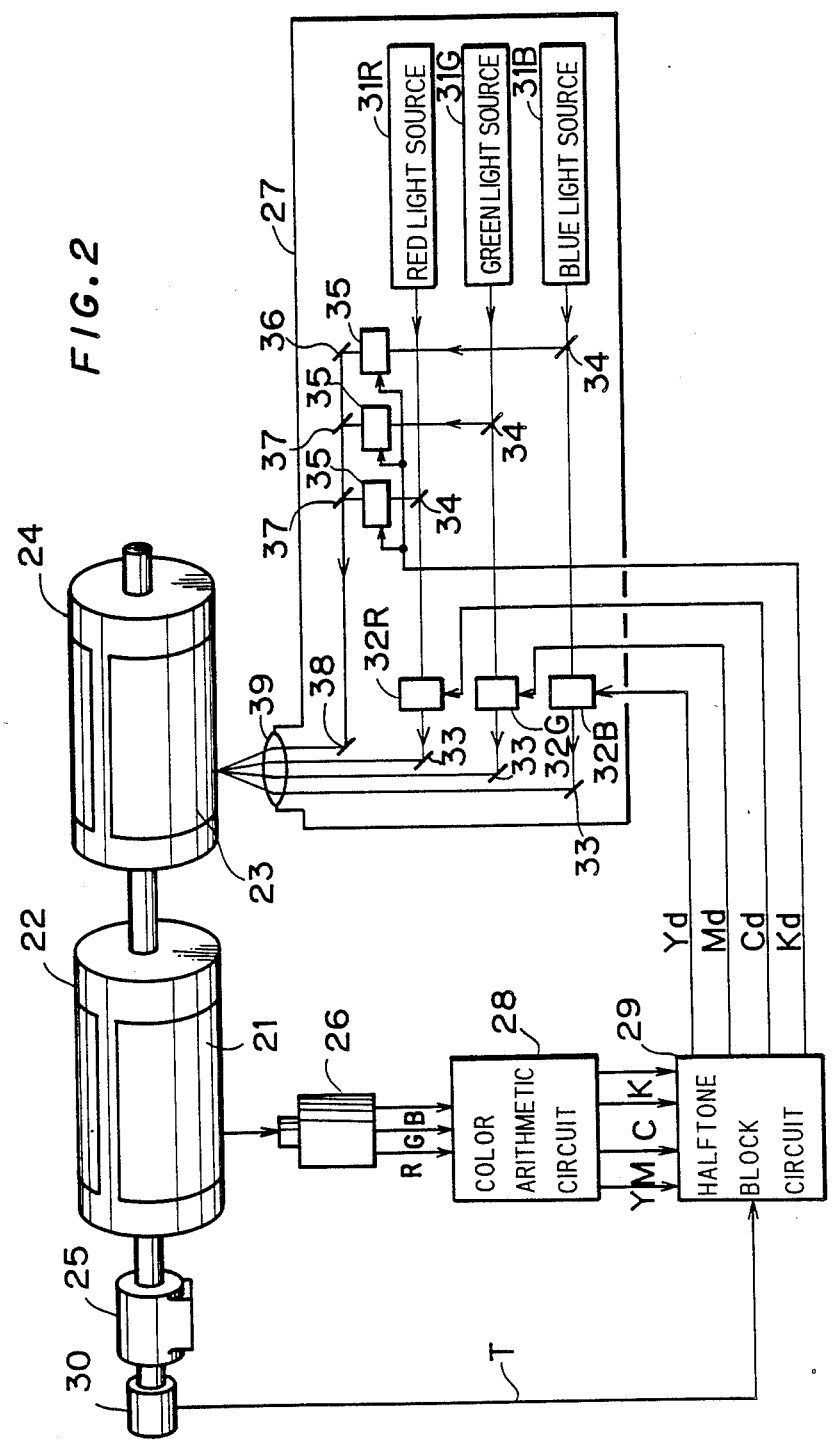
FIG. 2 is a block diagram showing an embodiment of an apparatus for recording a halftone dot color image on a color photosensitive material in accordance with the present invention.

FIG. 2 is a block diagram showing an embodiment of an apparatus for recording a halftone dot color image on a color photosensitive material in accordance with the present invention. Referring to FIG. 2, this apparatus includes an original drum 22 on which a color original 21 is attached, a recording drum 24 on which a color photosensitive material 23 is attached, a pickup head 26 provided opposite to the original drum 22 for photoelectrically scanning the color original 21 and an exposure head 27 provided opposite to the recording drum 24 for scanning and exposing the color photosensitive material 23 by an exposure beam. The original and recording drums 22 and 24 are coaxially and synchronously rotated by a motor 25, while the pickup and exposure heads 26 and 27 are moved along the respective axial directions of the drums 22 and 24.

The pickup head 26 has a well known function of color separation photoelectrical conversion, so that it photoelectrically scans the color original 21 to output color separation image signals R, G and B of red, green and blue in response to the tone and density of the color original 21 at a scanning point. These color separation image signals R, G and B are received by a color arithmetic circuit 28 which in turn performs desired color correction and the like to convert these color separation image signals R, G and B into other color separation image signals Y, M, G and K of yellow, magenta, cyan and black. The color arithmetic circuit 28 may have a structure similar to that in a well known conventional electronic color process scanner.

These color separation image signals Y, M, C and K are received by a halftone block circuit 29 or halftone dot generator, which in turn converts these signals Y, M, C and K into halftone dot image signals $Y_d$, $M_d$, $C_d$ and $K_d$ of yellow, magenta, cyan and black having particular screen angles for respective halftone blocks of yellow, magenta, cyan and black, in response to a timing pulse T generated by a rotary encoder 30 which is driven synchronously with the original drum 22. The halftone block circuit 29 is a well known and described, by way of example, U.S. Pat. No. 4,534,069.

The exposure head 27 includes three light sources 31R, 31G and 31B for emitting red, green and blue beams, respectively. These beams pass through AOMs 32R, 32G and 32B responsive to the halftone dot image signals $C_d$, $M_d$ and $Y_d$ of cyan, magenta and yellow, respectively, and thereafter they are reflected by total reflection mirrors 33 to be projected to a lens 39 on parallel optical paths. Half mirrors 34 are placed on optical paths between the light sources 31R, 31G and 31B and the AOMs 32R, 32G and 32B, to separate a par& of each beam. These separated beams pass through AOMs 35 responsive to the halftone dot image signal $K_d$ of black, and thereafter entrained, i.e. directed on the same optical path by a total reflection mirror 36 and two dichroic mirrors 37 so that they are combined to form a white beam. The white beam thus formed is reflected by a total reflection mirror 38 to be projected to the lens 39 on an optical path parallel to those of the three color beams of red, green and blue.

The lens 39 converges the three color and white beams onto the surface of the color photosensitive material 23 attached on the recording drum 24, to form an exposure beam spot. The color photosensitive material 23 is scanned in accordance with the rotation of the recording drum 24 and the relative movement of the exposure head 27 to the recording drum 24 in the direction of a rotational axis of the recording drum 24, while exposed with the beams converged by the lens 39.

The AOMs 32R, 32G and 32B, through which the red, green and blue beams pass, respectively, receive the halftone dot image signals $C_d$, $M_d$, and $Y_d$ for cyan, magenta and yellow halftone blocks which are in a complementary color relationship with the colors of the beams, i.e, red, green and blue, respectively. The three AOMs 35, through which the separated red, green and blue beams for use in forming the white beam pass, respectively, receive the common halftone dot image signal $K_d$ for a black halftone block. The halftone dot image signals $Y_d$, $M_d$, $C_d$ and $K_d$ may be binary signals which turn the AOMs 32R, 32G, 32B and 35 on and off thereby determining whether each small area of the color photosensitive material 23 is exposed. The AOMs 32R, 32G, 32B and 35 modulate the luminance of corresponding beams in response to the halftone do& image signals $C_d$, $M_d$, $Y_d$ and $K_d$, respectively, during the exposure of the color photosensitive material 23. Thus, the photosensitive material 23 is concurrently exposed with the blue beam modulated in response to the halftone dot image signal $Y_d$ for a yellow halftone block, the green beam modulated in response to the halftone dot image signal $M_d$ for a magenta halftone block, the red beam modulated in response to the halftone dot image signal $C_d$ for a cyan halftone block and the white beam modulated in response to the halftone dot image signal $K_d$ for a black halftone block, with the result that the halftone dot images corresponding to images of the respective halftone blocks are recorded in a overlapped manner.

The size of each spot formed by the exposure beam spot in response to the halftone dot image signals $Y_d$, $M_d$, $C_d$ and $K_d$ may be the same as or smaller than the size of a pixel of the color separation image signals R, G and B. In general, the former is one, several, or several-tens times the size of the latter. In the case here the former is smaller than the latter, plural recording using the halftone dot image signals $Y_d$, $M_d$, $C_d$ and $K_d$ may be performed with a single beam for each reading main scanning for obtaining the color separation image signals R, G and B, or instead a multibeam exposure system disclosed in. e.g., U.S. Pat. No. 4,617,578 may be utilized, to match sizes in reading and recording sides with each other.

After completion of the scanning and exposing operations on an entire image area, the color photosensitive material 23 is detached from the recording drum 24 and is developed. Thus a duplicate halftone dot color image of the original 21 is obtained.

In an electronic color process scanner, halftone dot images for respective colors are generally recorded on respective films on the basis of the respective halftone dot L image signals $Y_d$, $M_d$, $C_d$ and $K_d$. Then, machine blocks of images corresponding to the halftone dot images on the respective films are formed. These machine blocks are used for practical multicolor printing herein the images of the machine blocks are printed in a overlapped manner by using corresponding color ink. In general, color proof is performed prior to such process and printing steps.

The color proof may be performed by using the above duplicate halftone dot color image of the original 21 recorded on the color photosensitive material 23. This duplicate color image is recorded in a halftone dot manner by utilizing the halftone dot image signals $Y_d$, $M_d$, $C_d$ and $K_d$ for multicolor printing, and hence it has high fidelity and similarity with respect to an image in multicolor printing. Therefore, an operator can easily and exactly judge whether image processing condition such as color correction is suitably set, even if he is not skilled.

Figure 3:
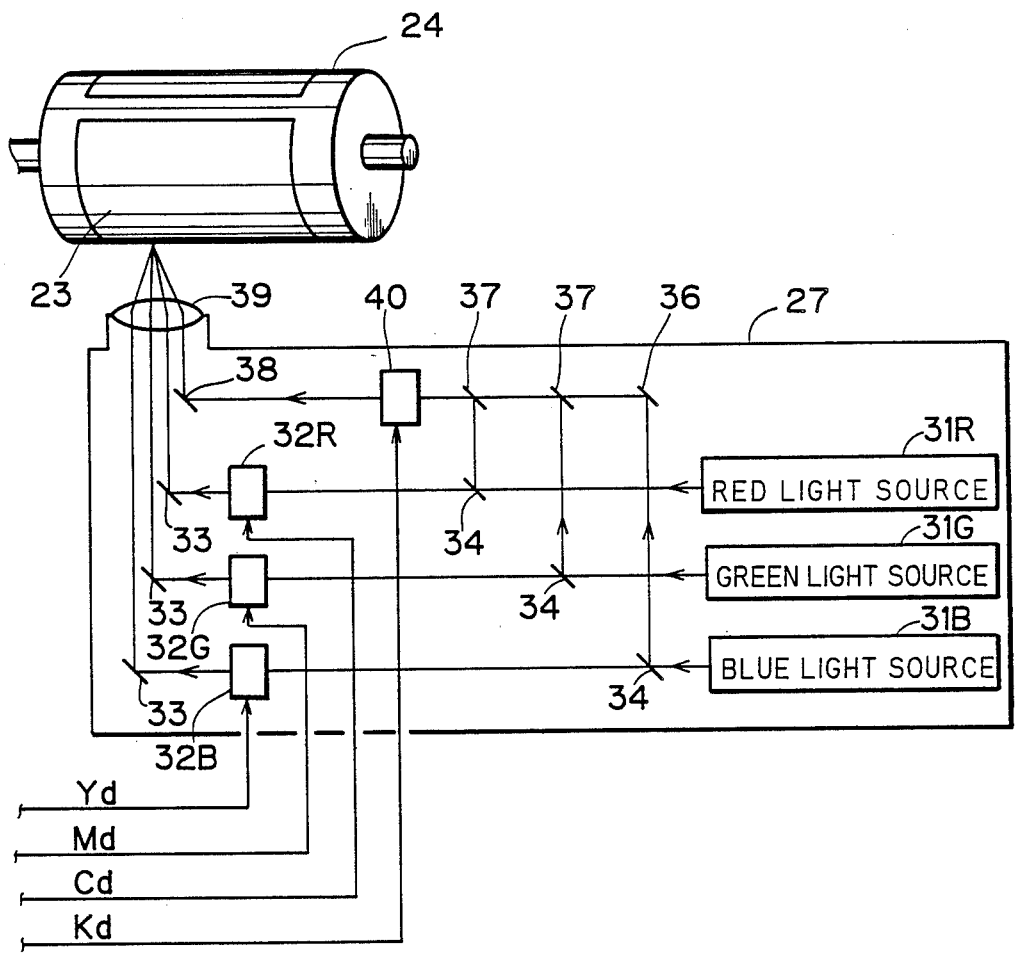
FIG. 3 and FIG. 4 are block diagrams showing modifications of a recording head.

The AOMs 32R, 32G, 32B and 35 may be replaced by an appropriate light intercepter such as a PLZT element made by Motorola Semiconductor. FIG. 3 is a block diagram showing a modification of a recording head, wherein a recording head 27 has a light intercepter 40 provided on the optical path of a white beam made by combining separated red, green and blue beams, in place of the AOMs 35 of the system shown in FIG. 2. The light intercepter 40 is turned ON/OFF in response to a halftone dot image signal $K_d$ of black. Other structures are the same as those shown in FIG. 2.

Figure 4:
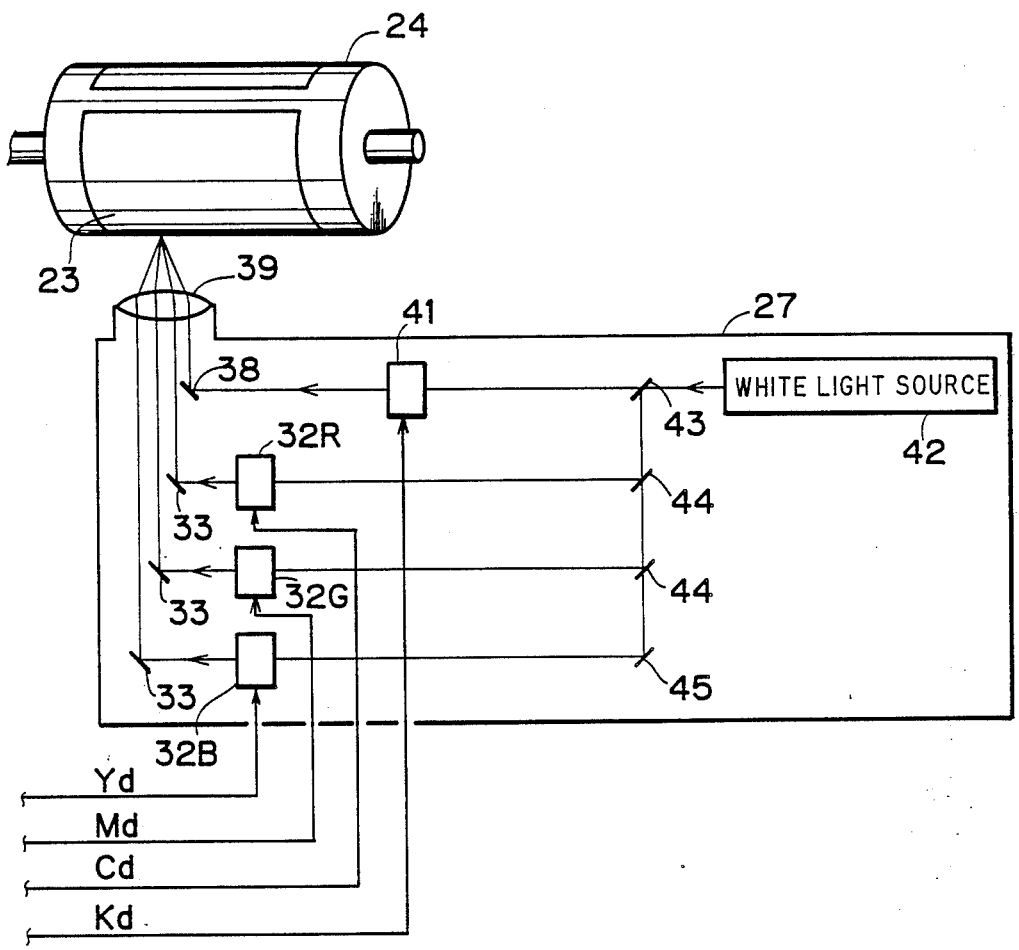

FIG. 4 is block diagram showing another modification of a recording head, wherein a recording head 27 has a light intercepter 41 provided on the optical path of a white beam emitted from a white light source 42. A part of the white beam is separated by a half mirror 43. Red, green and blue beams are extracted from the separated white beam through two dichroic mirrors 44 and a total reflection mirror 45, to be received by AOMs 32R, 32G and 32 B, respectively. The light intercepter 41 is turned ON/OFF in response to a halftone dot image signal $K_d$ of black. Other structures are the same as those shown in FIG. 2.

In the aforementioned embodiments, the parallel red, green, blue and white beams are converged by the lens 39. Instead, the red, green, blue and white beams may be combined on a single optical path by using dichroic mirrors and the like, to irradiate the color photosensitive material 23.

The color separation image signals R, G and B and/or the other color separation image signals Y, M, C and K may be temporally stored in a storage unit such as a magnetic disk unit for later retrieval and usage. The above system is applicable to color image recording on the basis of image signals generated by a computer or the like.

In the color arithmetic circuit 28, color correction may be performed in accordance with the color generating characteristics of the color photosensitive material 23. In place of the multicolor image, two or three colors image as conventionally used in a two or three colors printing may be recorded on the color photosensitive material 23.

Instead of being ON/OFF controlled, the AOMs 32R, 32G, 32B and 35 may be so modulated as to perform a dot etching processing where a halftone dot after development is decreased in size by reducing an exposure amount in a peripheral portion of each halftone dot to be recorded.

Although the embodiments wherein the present invention is applied to a drum scanning type image processing system has been described, the present invention is also applicable to a flat scanning type image processing systems.

Although the present invention has been described and illustrated in detail, it is to be clearly understood that the same is of illustration and example only and is not to be taken by way of limitation, the spirit and scope of the present invention being limited only by the terms of the appended claims.

What is claimed is:

1. A method of recording a halftone dot color image on a color photosensitive material, comprising the steps of:
   providing a color photosensitive material;
   providing red, green and blue beams;
   forming a white beam by combining said red, green and blue beams;
   generating yellow, magenta, cyan and black color separation image signals of a desired color image;
   converting said color separation image signals into yellow, magenta, cyan and black halftone dot image signals having particular screen angles;
   modulating said red, green, blue and white beams with said halftone dot image signals of cyan, magenta, yellow and black, respectively, to generate modulated red, green, blue and white beams;
   converging said modulated red, green, blue and white beams onto said color photosensitive material to form an exposure beam spot; and
   exposing said color photosensitive material to said exposure beam spot by moving said color photosensitive material and said exposure beam spot relative to one another to record said desired color image in a halftone dot manner on said color photosensitive material.

2. A method of recording a halftone dot color image on a color photosensitive material, comprising the steps of:
   providing a color photosensitive material;
   providing a white beam;
   separating red, green and blue beams from said white beam;
   generating yellow, magenta, cyan and black color separation image signals of a desired color image;
   converting said color separation image signals into yellow, magenta, cyan and black halftone dot image signals having particular screen angles;
   modulating said red, green, blue and white beams with said halftone dot image signals of cyan, magenta, yellow and black, respectively, to form modulated red, green, blue and white beams;
   converging said modulated red, green, blue and white beams onto said color photosensitive material to form an exposure beam spot; and
   exposing said color photosensitive material to said exposure beam spot by moving said color photosensitive material and said exposure beam spot relative to one another to record said desired color image in a halftone dot manner on said color photosensitive material.

3. An apparatus for recording a halftone dot color image on a color photosensitive material, comprising:
   means for providing red, green and blue beams;
   beam forming means for forming a white beam by combining said red, green and blue beams;
   means for providing yellow, magenta, cyan and black color separation image signals of a desired color image;
   means for converting said yellow, magenta, cyan and black color separation image signals respectively into yellow, magenta, cyan and black halftone dot image signals having particular screen angles;
   beam modulating means for modulating said red, green, blue and white beams with said halftone dot image signals of cyan, magenta, yellow and black, respectively, to generate modulated red, green, blue and white beams;
   beam converging means for converging said modulated red, green, blue and white beams onto said color photosensitive material to form an exposure beam spot; and
   means for exposing said color photosensitive material to said exposure beam spot by moving said color photosensitive material and said exposure beam spot relative to one another, to record said desired color image in a halftone dot manner on said color photosensitive material.

4. An apparatus in accordance with claim 3, wherein said beam comprises:
   means for separating a respective portion from each of said red, green and blue beams, and means for combining said respective portions of said red, green and blue beams to generate said white beam.

5. An apparatus in accordance with claim 3, wherein said beam modulating means includes an acousto-optical modulator.

6. An apparatus in accordance with claim 3, wherein said beam modulating means includes a light interceptor.

7. An apparatus in accordance with claim 6, wherein said light interceptor includes a PLZT element.

8. An apparatus in accordance with claim 3, wherein said beam converging means comprises:
   means for directing said modulated red, green, blue and white beams on parallel optical paths, and
   a lens located on said parallel optical paths.

9. An apparatus in accordance with claim 3, wherein said beam converging means includes means for directing said modulated red, green, blue and white beams on the same optical path.

10. An apparatus for recording a halftone dot color image on a color photosensitive material, comprising:
    means for providing a white beam;
    beam extracting means for extracting red, green and blue beams from said white beam;
    means for providing yellow, magenta, cyan and black color separation image signals of a desired color image;
    means for converting said yellow, magenta, cyan and black color separation image signals respectively into yellow, magenta, cyan and black halftone dot image signals having particular screen angles;
    beam modulating means for modulating said red, green, blue and white beams with said halftone dot image signals of cyan, magenta, yellow and black, respectively, to form modulated red, green, blue and white beams;
    beam converging means for converging said modulated red, green, blue and white beams onto said color photosensitive material to form an exposure beam spot; and
    means for exposing said color photosensitive material to said exposure beam spot by moving said color photosensitive material and said exposure beam spot relative to one another, to record said desired color image in a halftone dot manner on said color photosensitive material.

11. An apparatus in accordance with claim 10, wherein
said beam extracting means comprises:
means for separating a portion of said white beam, and
means for deriving said red, green and blue beams from said portion of said white beam.

12. An apparatus in accordance with claim 10, wherein said beam modulating means includes an acousto-optical modulator.

13. An apparatus in accordance with claim 10, wherein said beam modulating means includes a light interceptor.

14. An apparatus in accordance with claim 13, wherein said light interceptor includes a PLZT element.

15. An apparatus in accordance with claim 10, wherein
said beam converging means comprises:
means for directing said modulated red, green, blue and white beams parallel optical paths, and
a lens located on said parallel optical paths.

16. An apparatus in accordance with claim 10, wherein said beam converging means includes means for directing said modulated red, green, blue and white beams on the same optical path.

* * * * *